US008823987B2

(12) United States Patent
Sponable et al.

(10) Patent No.: US 8,823,987 B2
(45) Date of Patent: Sep. 2, 2014

(54) VIRTUAL MEDIA TRAYS

(71) Applicant: Xerox Corporation, Norwalk, CT (US)

(72) Inventors: David R. Sponable, Keizer, OR (US); John A. Scriven, Lake Oswego, OR (US); Ashutosh P. Sanzgiri, Portland, OR (US); Christopher R. Rizzo, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 134 days.

(21) Appl. No.: 13/676,590

(22) Filed: Nov. 14, 2012

(65) Prior Publication Data

US 2014/0132983 A1  May 15, 2014

(51) Int. Cl.
*G06K 15/02* (2006.01)

(52) U.S. Cl.
CPC .................. *G06K 15/021* (2013.01)
USPC ......... 358/1.15; 358/1.1; 358/1.13; 358/1.16; 358/1.18

(58) Field of Classification Search
USPC ............. 358/1.1, 1.13, 1.15, 1.16, 1.18, 402, 358/403, 450; 434/118; 709/104, 223, 224, 709/227, 228
See application file for complete search history.

(56) References Cited

U.S. PATENT DOCUMENTS

| 5,006,891 | A | 4/1991 | Kasahara et al. |
| 6,049,391 | A | 4/2000 | Farrell |
| 6,369,905 | B1 | 4/2002 | Mitsuhashi et al. |
| 6,647,222 | B1 | 11/2003 | Digby et al. |
| 7,142,690 | B2 | 11/2006 | Hyakutake et al. |
| 7,251,047 | B2 | 7/2007 | Meade, II |
| 7,619,763 | B2 | 11/2009 | Gibson |
| 7,669,148 | B2 * | 2/2010 | Hull et al. ...................... 715/864 |
| 7,787,791 | B2 | 8/2010 | Bartley et al. |
| 7,874,664 | B2 | 1/2011 | Gervasi et al. |
| 2002/0116439 | A1 * | 8/2002 | Someshwar et al. .......... 709/104 |
| 2003/0202210 | A1 | 10/2003 | Anderson |
| 2004/0150157 | A1 * | 8/2004 | Meade, II ...................... 271/298 |
| 2007/0202473 | A1 * | 8/2007 | Koda et al. ..................... 434/118 |

* cited by examiner

*Primary Examiner* — Allen H Nguyen
(74) *Attorney, Agent, or Firm* — Gibb & Riley, LLC

(57) ABSTRACT

Methods and devices maintain the status of unaltered media currently available within physical media trays of a printing device and maintain the status of currently available media processing components of the printing device. The media processing components have elements that physically alter the unaltered media. Further, such methods and devices dynamically enable previously created virtual media trays (and/or create virtual media trays) based on the availability of the unaltered media and the availability of the media processing components. The virtual media trays virtually appear to contain virtual media that is physically different from the unaltered media currently available. Such methods and devices receive a request to print on a selected virtual media from one of the virtual media trays through the graphic user interface. Then, these methods and devices physically alter the unaltered media using the media processing components to physically change the unaltered media to the selected virtual media.

24 Claims, 4 Drawing Sheets

VIRTUAL MEDIA TRAYS

BACKGROUND

Embodiments herein generally relate to printing devices and printing methods and more particularly to providing additional types of print media beyond those currently present in the physical media trays by using virtual media trays.

Today the number of currently available media types for a printer (or multi-function device (MFD)) is limited by the number of physical input trays within the printer. For example, a device with four physical trays can only present four different media type options to the user under the printing options. Therefore, a user needs to physically place media that matches the print job requirements in one of the media trays to be able to print on the desired media. For example, if a user submits a print job that requires 8.5×11 drilled pink media, one of the trays must physically contain 8.5×11 drilled pink media sheets, or the job will be held. The job will not proceed until the requested media is loaded. Whether a print job proceeds can be addressed with attribute fidelity where, if fidelity is not set for a job (or fidelity is false) the printer will attempt to mark on the closest available media.

SUMMARY

This invention allows an administrator to create virtual media for immediate print availability. Virtual media may be created out of stock media and the more features a device has, the more complicated the virtual media may be. For example, a color printer with a hole punch finisher may have two trays, one with 8.5×11 white and one with 8.5×14 white. With the devices and methods herein, an administrator may add "virtual media" to "virtual trays" that may be constructed out of the two physically loaded medias. Therefore, for example, an 8.5×11 light blue drilled virtual media may be "loaded" into "virtual tray 1" on such a printing device.

An exemplary printing device herein includes, among other components, a processor, a printing engine operatively (meaning directly or indirectly) connected to the processor, physical media trays operatively connected to the processor, a graphic user interface operatively connected to the processor, and media processing components operatively connected to the processor. The media processing components can, for example, change the size or shape of the media, form openings in the media, change the uniform background color of the media, etc.

The physical media trays maintain unaltered media, and such unaltered media is supplied to the printing engine for printing operations. The media processing components have elements that physically alter the unaltered media. The processor maintains the status of unaltered media currently available within the physical media trays, and the processor also maintains the status of currently available media processing components of the media processing components.

The processor can dynamically enable previously created (previously defined) virtual media trays based on the status of the unaltered media currently available and the status of the currently available media processing components. Such virtual media trays virtually appear to contain virtual media that is physically different from the unaltered media currently available. A user, such as an administrator, can previously define the physical features of the virtual media.

Alternatively (or in addition to the previously defined virtual media trays) the processor itself can automatically and dynamically create virtual media trays potentially based on all possible combinations that can be produced from the unaltered media currently available and the currently available media processing components (as their status is maintained by the processor).

The processor maintains the status of currently available media processing components by determining the current operational status of each media processing component and similarly maintains the status of what unaltered media is currently available within the physical media trays. This allows the processor to dynamically enable or create the virtual media trays by changing the virtual media trays when the unaltered media that is currently available changes and/or when the currently available media processing components change.

The graphic user interface simultaneously displays the physical media trays side-by-side with the virtual media trays as printing options. The graphic user interface will eventually receive requests to print on a selected virtual media from one of the virtual media trays. During the overall media processing and printing operations, the media processing components physically alter the unaltered media to physically change the unaltered media to the selected virtual media. Therefore, the virtual media trays only virtually appear to contain the virtual media that is physically different from the unaltered media currently available, because such virtual media does not actually become physically present until the media processing components physically change the unaltered media to the virtual media.

Further, during the overall media processing and printing operations, the printing engine places print markings on the selected virtual media. The media processing components change the unaltered media in a manner that is different from the print markings, and that is in addition to the print markings.

The graphic user interface will also receive requests to print on a selected unaltered media from one of the physical media trays. In such a situation, the printing engine prints on the selected unaltered media without having the media processing components physically alter the unaltered media.

Various exemplary method embodiments herein maintain the status of the unaltered media currently available within the physical media trays of the printing device. Again, such unaltered media is available for printing operations of the printing device. Further, such methods maintain the status of currently available media processing components of the printing device (e.g., by determining the current operational status of each media processing component). The media processing components again have elements that physically alter the media.

Further, such methods dynamically enable previously created virtual media trays (and/or create virtual media trays) based on the availability of the unaltered media and the availability of the media processing components. The virtual media trays virtually appear to contain virtual media that is physically different from the unaltered media currently available. Again, a user can previously define physical features of the virtual media.

Such methods also display the physical media trays and the virtual media trays as printing options on a graphic user interface. The process of dynamically enabling or creating the virtual media trays changes the virtual media trays that are displayed to the user based on the availability of the unaltered media and the media processing components.

These methods eventually receive requests to print on a selected virtual media from one of the virtual media trays through the graphic user interface. Then, these methods physically alter the unaltered media using the media processing components to physically change the unaltered media to the selected virtual media. The process of physically altering the unaltered media can change the size and/or shape of the unaltered media, can form openings in the unaltered media, can change the uniform background color of the unaltered media currently available, etc.

Any such request to print will include instructions to place print markings on the selected virtual media. However, the process of physically altering changes the unaltered media in a manner that is different from, and is in addition to the print markings.

These methods also eventually receive requests to print on a selected unaltered media from one of the physical media trays through the graphic user interface. When presented with a selection of one of the physical media trays, such methods print on the selected unaltered media without physically altering the unaltered media.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, currently available media types for a printer (or multi-function device (MFD)) are limited by the number of physical input trays within the printer. In view of this, the printing device and methods herein allow customers a virtually unlimited selection of different types of medias based solely on a combination of the media types currently loaded in the physical media trays and the printing device's capabilities. The printing devices and methods herein are highly scalable for all classes of printers. The printing device's capabilities can include, for example, die cutting to enable virtual media sizes, hole punching to enable "pre-drilled" type, color printing to enable media color, etc.

With the printing devices and methods herein the system administrator may enable "virtual media" or "virtual trays" via device web user interface or local user interface. Further, the system administrator may add virtual trays by selecting or defining media attributes for the virtual trays based on the printing device's capabilities and the currently loaded media. There exists an implicit dependency between virtual media and currently loaded media because when currently loaded media runs out (or is changed), virtual media and availability will be affected.

The printing devices and methods herein report all physically loaded media and virtual media in the same way, so that the selection of a virtual media is transparent to the user (the physically loaded media and virtual media look the same to the end user). The user may select any available media from the list presented and submit a job. The job will mark according the media attributes specified by the system (and selected by the user). The printing devices and methods herein can internally store all virtual media types for display to users, and such can be persistent across reboots and firmware upgrades.

Figure 1:
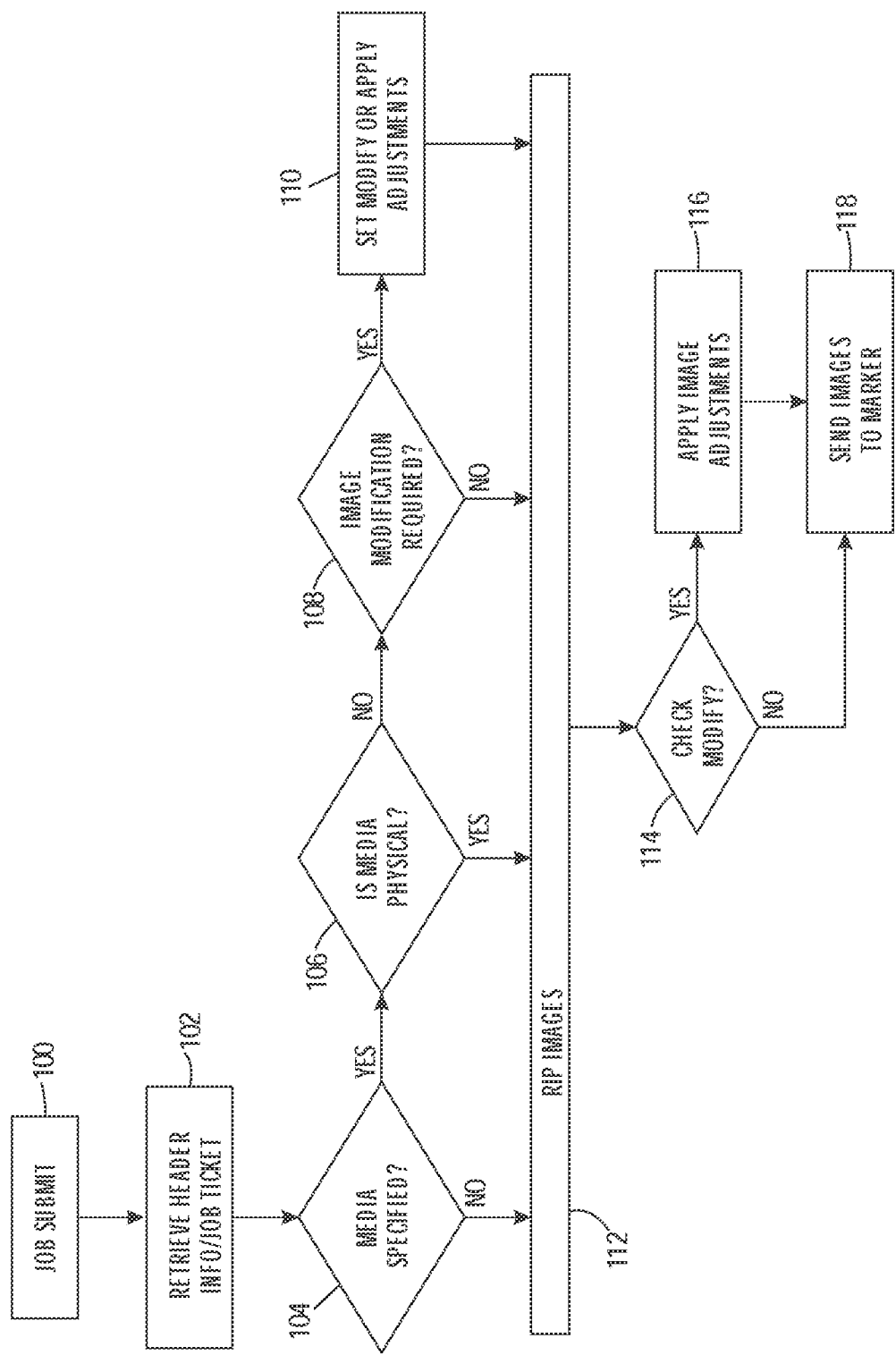
FIG. 1 is a flow diagram illustrating various methods herein.

FIG. 1 is one exemplary flowchart that illustrates various features of the printing devices and methods herein. In item 100, print jobs are submitted via a print driver. This allows the printing device to retrieve header information and/or a job ticket in item 102. Print jobs may be submitted in many different ways, for example, with a job ticket specifying media options or with media information specified in the header, or in the page description language (PDL) itself. The printing devices and methods herein process this information to determine what output media the print job requires.

In item 104, if the media is not specified, processing proceeds to raster image processing (RIP of the images) 112; however, if the media is specified, processing proceeds to item 106 where a determination is made as to whether the specified media is physically present or is a virtual media. If the specified media is physical, processing can proceed to the RIP in item 112. If the specified media is virtual, item 108 determines if the media requested directly maps to one already loaded in one of the output trays, or whether image modification is required. If the media requested directly maps to one already loaded in one of the output trays, the processing continues to RIP the job in item 112. However, if image modification is required (meaning that the printing device does not have the requested media loaded, but the virtual media is a supported virtual media), the image modification is made in item 110 by setting modifications or applying adjustments. In addition, image modification may be required post RIP, as shown in item 114. In this case, again adjustments can be applied in item 116. After this processing, the images are sent to the marking engine in item 118.

Therefore, for example, if a user requests "blue clouds 8.5×11" but only "white 8.5×11" is loaded, the image is manipulated in item 110 or 116 to add "blue clouds" to any alpha channel and white of the job. If the image modifications or adjustments can be performed pre-RIP, such will be performed in item 110; otherwise, a flag is set for the print path to check after image has been ripped so that the adjustments can potentially be performed in item 116.

Figure 2:
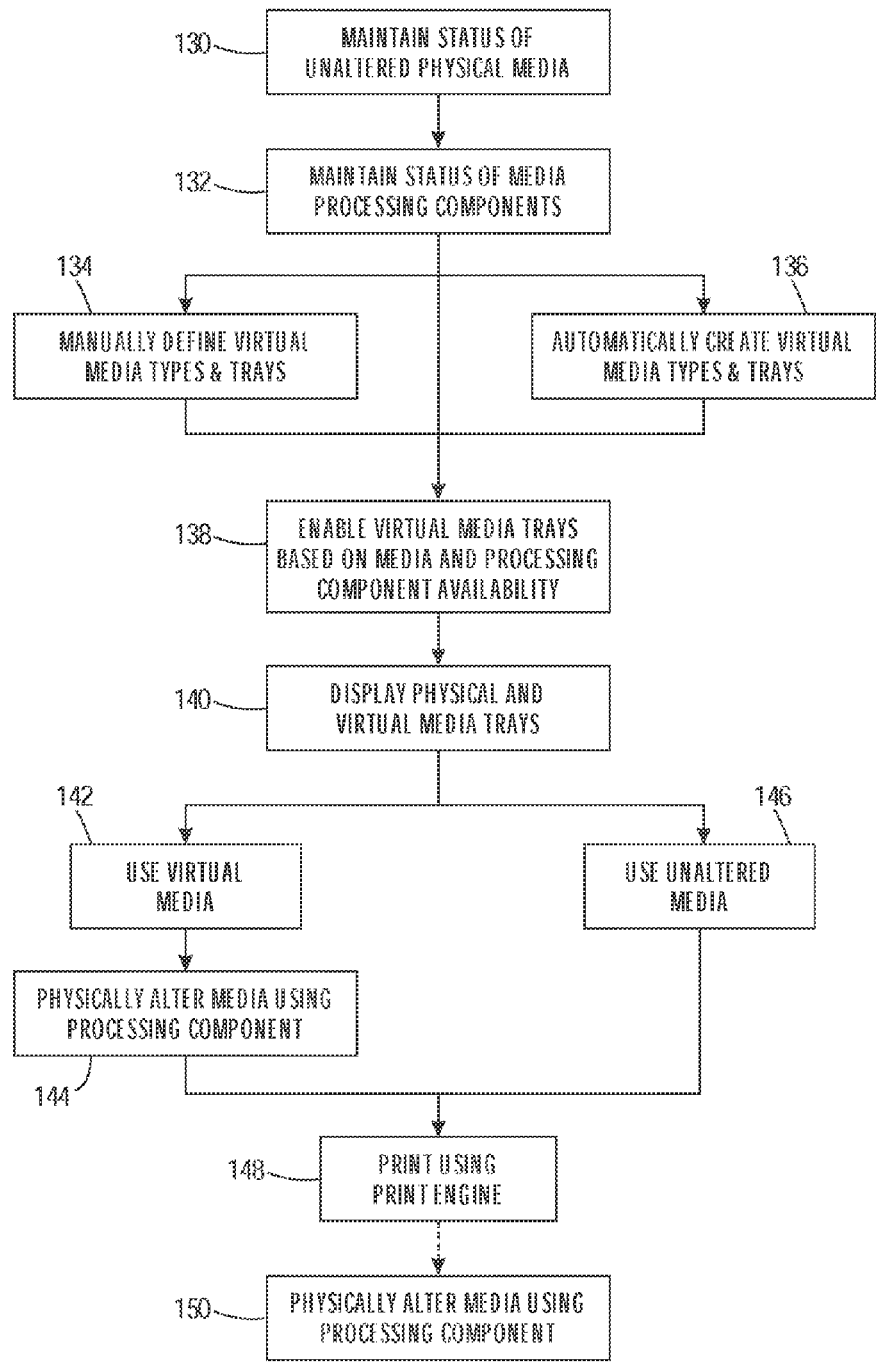
FIG. 2 is a flow diagram illustrating various methods herein.

FIG. 2 is flowchart illustrating another exemplary method herein. In item 130, these methods maintain the status of the unaltered media currently available within the physical media trays of the printing device. Again, such unaltered media is available for printing operations of the printing device. For example, all "media" mentioned herein can comprise any form of material that is used as a printing substrate, such as paper, cardstock, transparencies, plastics, ceramics, magnetic materials, metals, etc., and can be in sheet form, or on rolls in the form a continuous web of material (which may be cut into sheets, if desired).

In addition, the phrase "media tray" is used herein as a shorthand term to describe all possible storage locations for any type of media, which can include a tray, a drawer, a roll, a platform, etc. Such media trays generally have sensors that indicate whether media is present (and potentially how much media is present). Further, such sensors can automatically determine the size, thickness, weight, etc., of the media, or such information can be entered automatically or manually supplied to the printing device, when the media is loaded into the media trays (or at a later or earlier time).

Further, in item 132, such methods maintain the status of currently available media processing components of the printing device (e.g., by determining the current operational status of each media processing component). The media processing components again have elements that physically alter the media and such media processing components can have sensors to indicate whether they are available for use or are out of service (because they need maintenance or more consumable supplies). All such sensors herein are operatively connected to one or more processors herein.

Item 134 illustrates the process of manually creating a virtual media tray by defining its various physical attributes, such as media dimensions, thickness, shape, color, etc. Alternatively (or in addition to the previously defined virtual media trays) in item 138, such methods automatically and dynamically create virtual media trays potentially based on all possible combinations and permutations that can be produced from the unaltered media currently available and the currently available media processing components (since their status is maintained by the processor).

For example, a potentially unlimited number of different combinations of colors, shapes, dimensions, sizes, etc., could be manually (134) or automatically (136) combined to create a potentially unlimited number of virtual media types and virtual media trays. Alternatively, devices herein can be manufactured with pre-loaded virtual media types and trays.

The methods herein can establish limits as to the number of virtual media types and virtual media trays that can be created. Further, the methods here can establish limits as to how similar or dissimilar such automatically created virtual media types and virtual media trays are required to be, so as to limit the number of virtual media types from becoming to large. For example, different sizes of virtual media may be required to be at least a certain percentage (e.g., 10%) different from other virtual media sizes, different colors of virtual media may be required to be a certain color distance from other virtual media colors, etc.

In addition, embodiments herein can create new virtual media "on the fly" as needed. Therefore, the systems and methods herein can physically change the media in one physical tray to match the media that was in a different tray, if that media runs out mid-job. For example, if a job calls for 8×11 standard copy media (which is loaded in a physical tray) and that tray runs out of the 8×11 standard copy media, the devices and methods herein can seamlessly create a new virtual tray for the empty physical tray (mid-job) and automatically draw 8×14 standard copy media from another physical tray and use the processing components to reduce the size of the 8×14 to the job required 8×11. This can be fully automated and can be done mid-print job (while the print job is printing) so that the user is unaware that a different physical tray was used from the one selected, and is unaware that the media from one tray was physically changed to allow their job to automatically complete when the media in the originally intended tray was fully consumed. In other embodiments, when a job that runs out of media before completing printing, the user interface can give the user the option to refill the empty media tray or to continue the job with altered media from the newly created virtual tray.

Whether virtual media is manually defined (134), automatically created (136), or the base virtual media type definitions supplied with the printing devices herein are used, the methods herein (in item 138) automatically and dynamically enable such virtual media trays (and/or create virtual media trays) based on the availability of the unaltered media and the availability of the media processing components. Such methods also display the physical media trays and the virtual media trays as printing options on a graphic user interface in item 140.

The process of dynamically enabling or creating the virtual media trays in item 138 changes the virtual media trays that are displayed to the user in item 140 based on the availability of the unaltered media and the media processing components. Therefore, if a media processing component goes out of service, or if a physical media tray becomes empty, the virtual media trays that relied upon such items would no longer be shown on the graphic user interface in item 140 (or may be shown as unavailable by being grayed-out) but such virtual media trays would reappear as fully available on the display when the problems with the media processing component is rectified or the physical media tray is refilled with the matching type of physical media.

These methods eventually receive requests to print on a selected virtual media from one of the virtual media trays through the graphic user interface in item 142. Then, these methods physically alter the unaltered media using the media processing components to physically change the unaltered media to the selected virtual media in item 144. Note that the physical alteration of the media can be done partially or fully before the printing in item 144 or partially or fully after the printing in item 150. The process of physically altering the unaltered media in items 144 and 150 can change the size and/or shape of the unaltered media (using die cutters, etc.); can form openings in the unaltered media (using drills, hole punches, etc.); can change the uniform background color of the unaltered media currently available (through background printing, etc.); can change (reduce) the thickness of the media (using shaving and grinding devices, etc.); etc.

These methods also eventually receive requests to print on a selected unaltered media from one of the physical media trays through the graphic user interface in item 146. When presented with a selection of one of the physical media trays for unaltered media 146, such methods print on the selected unaltered media without physically altering the unaltered media in item 148.

Any such request to print will include instructions to place print markings on the selected virtual media in item 148. However, the process of physically altering the media in item 144 and 150 changes the unaltered media in a manner that is different from, and is in addition to the print markings in item 148.

Figure 3:
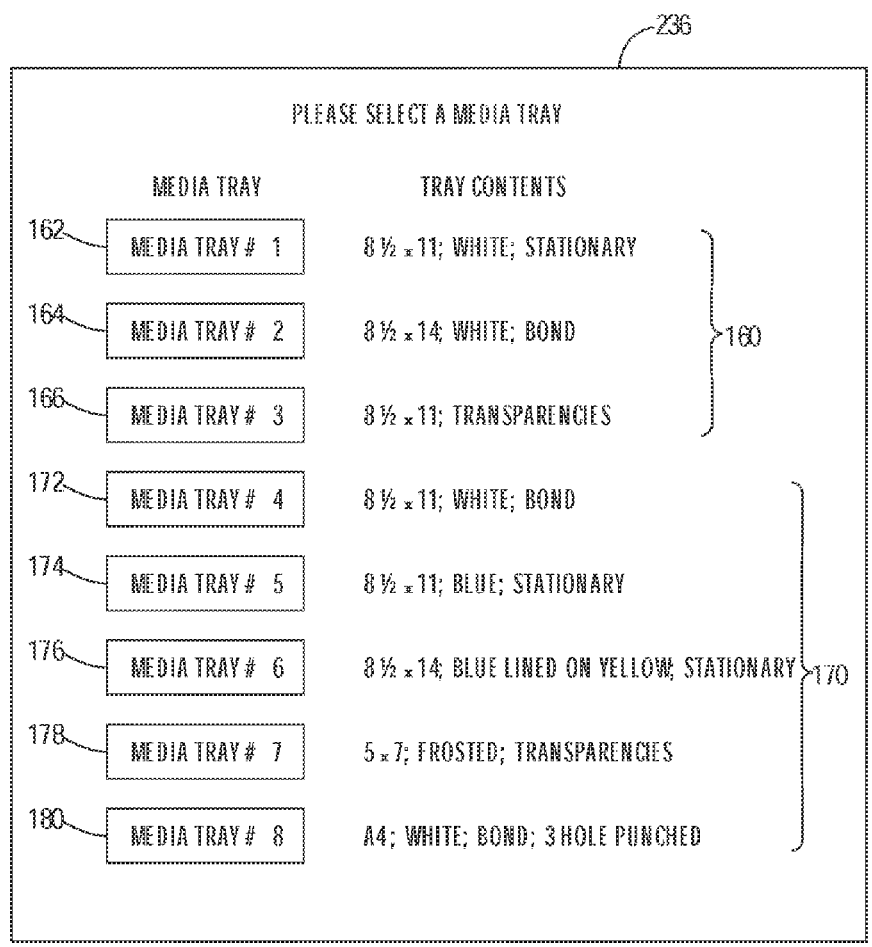
FIG. 3 is a illustration shown a screenshot containing various virtual media trays according to embodiments herein.

FIG. 3 illustrates an exemplary screen shot display that could be presented on a graphic user interface 236 of devices herein. The display shown in FIG. 3 asks the user to select a media tray from which the media to be used for their print job will be drawn. Items 160 are actual physical media trays. Items 170 are virtual media trays.

More specifically, media tray #1 (162) is physically loaded with 8½×11, stationary (e.g., white, medium weight) sheets of paper; media tray #2 (164) is physically loaded with 8½×14, white, bond sheets of paper; media tray #3 (166) is physically loaded with 8½×11, transparencies sheets. Further, the printing device where these trays are located currently has functioning processing components including: a color print engine, a paper cutter, a hole press, and a paper grinder. With the combination of physically loaded and unaltered media, and such functioning processing components, the following virtual media trays 170 are enabled.

Media tray #4 (172) automatically cuts the 8½×14, white, bond sheets of paper (from physical media tray #2) using the paper cutter to 8½×11, white, bond sheets of paper (before or after printing). Therefore, media tray #4 is shown just as any other physical media tray is shown to the user as simply having 8½×11, white, bond sheets of paper, and the user will receive the same without performing any additional activities other than selecting media tray #4 (the user does not need to cut the sheets manually or load a different type of media into the printing device).

Also, media tray #5 (174) automatically prints a uniform blue background on the entire 8½×11, white, medium sheets of paper (from physical media tray #1) while printing the text or graphics of the print job itself to produce the print job on 8½×11, blue, stationary sheets of paper. Again, no additional action (such as loading different media or selecting a background) is required of the user. Instead, the user merely selects the virtual media tray #5.

Media tray #6 (176) automatically shaves the thickness of the 8½×14, white, bond sheets (from physical media tray #2) using the paper grinder to reduce such sheets to a medium weight (e.g., stationary). After reducing the thickness of the sheets from physical media tray #2, the printing device prints a uniform yellow background (lined with blue lines) on the entire 8½×14, white, stationary sheets of paper while printing the text or graphics of the print job itself to produce the print job on 8½×14; blue lined on yellow; stationary sheets of paper. Again, no additional action (such as loading different media or selecting a background) is required of the user. Instead, the user merely selects the virtual media tray #6.

Media tray #7 (178) automatically cuts the 8½×11, transparency sheets (from physical media tray #3) using the paper cutter to 5×7, transparency sheets (before or after printing). Then, before or after cutting the transparencies from physical media tray #3 the printing device prints a uniform frosted color (e.g., white or gray dot patterns) on the entire transparency sheets while printing the text or graphics of the print job itself to produce the print job on 5×7, frosted transparency sheets. Again, no additional action (such as loading different media or selecting a background) is required of the user. Instead, the user merely selects the virtual media tray #7.

Media tray #8 (180) automatically cuts the 8½×14, white, bond sheets of paper (from physical media tray #2) using the paper cutter to A4, white, bond sheets of paper and places 3-hole punch holes in the same using the hole punch (before or after printing). Before or after such cutting and hole punching, the printing engine prints the text or graphics of the print job itself. Again, here the user will receive the A4, white, bond sheets of paper with 3-hole punch holes without performing any additional activities other than selecting media tray #8 (the user does not need to cut the sheets manually or load a different type of media into the printing device).

Figure 4:
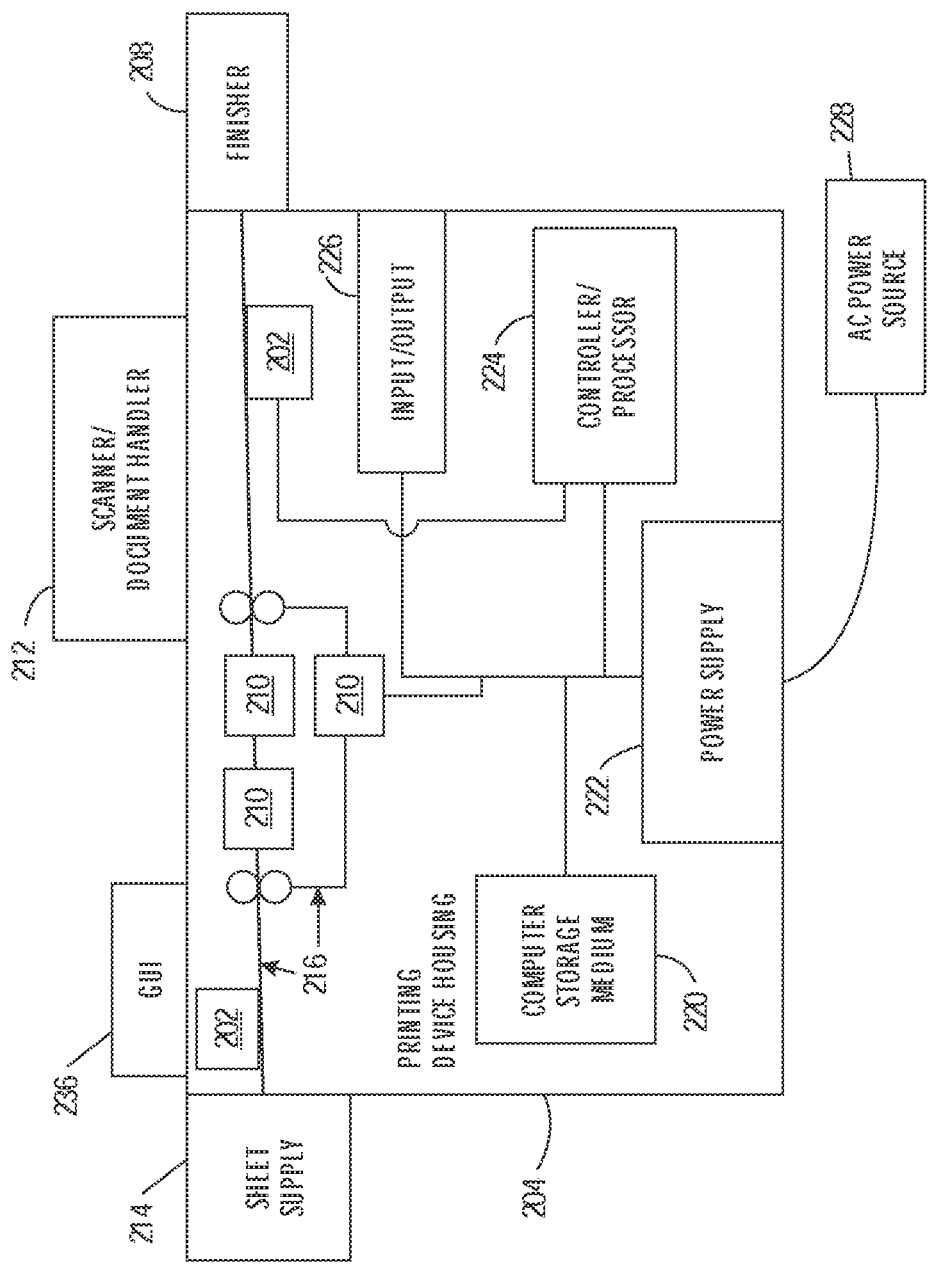
FIG. 4 is a side-view schematic diagram of a device according to embodiments herein.

FIG. 4 illustrates a computerized device that is a printing device 204, which can be used with embodiments herein and can comprise, for example, a printer, copier, multi-function machine, multi-function device (MFD), etc. The printing device 204 includes a controller/processor 224 and a communications port (input/output) 226 operatively connected to the processor 224 and to the computerized network 202 external to the computerized device 204. Also, the computerized device 204 can include at least one accessory functional component, such as a graphic user interface assembly 236 that also operate on the power supplied from the external power source 228 (through the power supply 222).

The input/output device 226 is used for communications to and from the computerized device 204. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 204 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

The printing device 204 also includes at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Further, items 202 represent the media processing components 202 which can, for example, change the size or shape of the media, form openings in the media, change the uniform background color of the media, etc. The physical media trays 214 maintain unaltered media, and such unaltered media is supplied to the printing engine 210 for printing operations. The media processing components 202 have elements that physically alter the unaltered media. The processor 224 maintains the status of unaltered media currently available within the physical media trays 214, and the processor 224 also maintains the status of currently available media processing components 202 of the media processing components 202.

The processor 224 can dynamically enable previously created (previously defined) virtual media trays based on the status of the unaltered media currently available and the status of the currently available media processing components 202. Such virtual media trays virtually appear to contain virtual media that is physically different from the unaltered media currently available. A user, such as an administrator, can previously define the physical features of the virtual media.

Alternatively (or in addition to the previously defined virtual media trays) the processor 224 itself can automatically and dynamically create virtual media trays potentially based on all possible combinations that can be produced from the unaltered media currently available and the currently available media processing components 202 (as their status is maintained by the processor 224).

The processor 224 maintains the status of currently available media processing components 202 by determining the current operational status of each media processing component and similarly maintains the status of what unaltered media is currently available within the physical media trays 214. This allows the processor 224 to dynamically enable or create the virtual media trays by changing the virtual media trays when the unaltered media that is currently available changes and/or when the currently available media processing components 202 change.

The graphic user interface 236 simultaneously displays the physical media trays side-by-side with the virtual media trays as printing options (as shown in FIG. 3). The graphic user interface will eventually receive requests to print on a selected virtual media from one of the virtual media trays. During the overall media processing and printing operations, the media processing components 202 physically alter the unaltered media to physically change the unaltered media to the selected virtual media. Therefore, the virtual media trays only virtually appear to contain the virtual media that is physically different from the unaltered media currently available, because such virtual media does not actually become physically present until the media processing components 202 physically change the unaltered media to the virtual media.

Further, during the overall media processing and printing operations, the printing engine 210 places print markings on the selected virtual media. The media processing components 202 change the unaltered media in a manner that is different from the print markings and that is in addition to the print markings.

The graphic user interface 236 will also receive requests to print on a selected unaltered media from one of the physical media trays 214. In such a situation, the printing engine 210 prints on the selected unaltered media without having the media processing components 202 physically alter the unaltered media.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A printing device comprising:
a processor;
a printing engine operatively connected to said processor;
physical media trays operatively connected to said processor, said physical media trays maintaining unaltered media, said unaltered media being supplied to said printing engine for printing operations;
a graphic user interface operatively connected to said processor; and
media processing components operatively connected to said processor, said media processing components having elements that physically alter said unaltered media,
said processor maintaining a status of unaltered media currently available within said physical media trays,
said processor maintaining a status of currently available media processing components of said media processing components,
said processor dynamically enabling previously created virtual media trays based on said status of said unaltered media currently available and said status of said currently available media processing components,
said virtual media trays virtually appearing to contain virtual media that is physically different from said unaltered media currently available, physical features of said virtual media being previously defined by a user,
said graphic user interface displaying said physical media trays and said virtual media trays as printing options,
said graphic user interface receiving a request to print on a selected virtual media from one of said virtual media trays, and
said currently available media processing components physically altering said unaltered media currently available to physically change said unaltered media currently available to said selected virtual media.

2. The printing device according to claim 1, said currently available media processing components at least one of changing a size of said unaltered media currently available, changing a shape of said unaltered media currently available, forming openings in said unaltered media currently available, changing a thickness of said unaltered media currently available, and changing a uniform background color of said unaltered media currently available.

3. The printing device according to claim 1, said printing engine placing print markings on said selected virtual media, said currently available media processing components changing said unaltered media currently available in a manner that is different from said print markings and is in addition to said print markings.

4. The printing device according to claim 1, said processor dynamically enabling said virtual media trays by changing said virtual media trays when at least one said unaltered media currently available and said currently available media processing components change.

5. The printing device according to claim 1, said processor maintaining said status of currently available media processing components by determining a current operational status of each media processing component.

6. The printing device according to claim 1, said graphic user interface further receiving a request to print on a selected unaltered media from one of said physical media trays; and
said printing engine printing on said selected unaltered media without said currently available media processing components physically altering said unaltered media.

7. A printing device comprising:
a processor;
a printing engine operatively connected to said processor;
physical media trays operatively connected to said processor, said physical media trays maintaining unaltered media, said unaltered media being supplied to said printing engine for printing operations;

a graphic user interface operatively connected to said processor; and media processing components operatively connected to said processor, said media processing components having elements that physically alter said unaltered media, said processor maintaining a status of unaltered media currently available within said physical media trays, said processor maintaining a status of currently available media processing components of said media processing components, said processor dynamically creating virtual media trays based on said status of said unaltered media currently available and said status of said currently available media processing components, said virtual media trays virtually appearing to contain virtual media that is physically different from said unaltered media currently available, said graphic user interface displaying said physical media trays and said virtual media trays as printing options, said graphic user interface receiving a request to print on a selected virtual media from one of said virtual media trays, and said currently available media processing components physically altering said unaltered media currently available to physically change said unaltered media currently available to said selected virtual media.

8. The printing device according to claim 7, said currently available media processing components at least one of changing a size of said unaltered media currently available, changing a shape of said unaltered media currently available, forming openings in said unaltered media currently available, changing a thickness of said unaltered media currently available, and changing a uniform background color of said unaltered media currently available.

9. The printing device according to claim 7, said printing engine placing print markings on said selected virtual media, said currently available media processing components changing said unaltered media currently available in a manner that is different from said print markings and is in addition to said print markings.

10. The printing device according to claim 7, said processor dynamically enabling said virtual media trays by changing said virtual media trays when at least one said unaltered media currently available and said currently available media processing components change.

11. The printing device according to claim 7, said processor maintaining said status of currently available media processing components by determining a current operational status of each media processing component.

12. The printing device according to claim 7, said graphic user interface further receiving a request to print on a selected unaltered media from one of said physical media trays; and said printing engine printing on said selected unaltered media without said currently available media processing components physically altering said unaltered media.

13. A method comprising:

maintaining a status of unaltered media currently available within physical media trays of a printing device, said unaltered media being available for printing operations of said printing device;

maintaining a status of currently available media processing components of said printing device, said media processing components having elements that physically alter said unaltered media;

dynamically enabling previously created virtual media trays based on said status of said unaltered media currently available and said status of said currently available media processing components, said virtual media trays virtually appearing to contain virtual media that is physically different from said unaltered media currently available, physical features of said virtual media being previously defined by a user;

displaying said physical media trays and said virtual media trays as printing options on a graphic user interface operatively connected to said printing device;

receiving a request to print on a selected virtual media from one of said virtual media trays through said graphic user interface; and physically altering said unaltered media currently available using said currently available media processing components to physically change said unaltered media currently available to said selected virtual media.

14. The method according to claim 13, said physically altering comprising at least one of changing a size of said unaltered media currently available, changing a shape of said unaltered media currently available, forming openings in said unaltered media currently available, changing a thickness of said unaltered media currently available, and changing a uniform background color of said unaltered media currently available.

15. The method according to claim 13, said request to print including instructions to place print markings on said selected virtual media, said physically altering comprising changing said unaltered media currently available in a manner that is different from said print markings and is in addition to said print markings.

16. The method according to claim 13, said dynamically enabling of said virtual media trays changing said virtual media trays when at least one said unaltered media currently available and said currently available media processing components change.

17. The method according to claim 13, said maintaining of said status of currently available media processing components comprising determining a current operational status of each media processing component.

18. The method according to claim 13, further comprising receiving a request to print on a selected unaltered media from one of said physical media trays through said graphic user interface; and printing on said selected unaltered media without physically altering said unaltered media.

19. A non-transitory storage medium storing instructions readable by computerized device, said instructions causing said computerized device to perform a method comprising:

maintaining a status of unaltered media currently available within physical media trays of a printing device, said unaltered media being available for printing operations of said printing device;

maintaining a status of currently available media processing components of said printing device, said media processing components having elements that physically alter said unaltered media;

dynamically enabling previously created virtual media trays based on said status of said unaltered media currently available and said status of said currently available media processing components, said virtual media trays virtually appearing to contain virtual media that is physically different from said unaltered media currently available, physical features of said virtual media being previously defined by a user;

displaying said physical media trays and said virtual media trays as printing options on a graphic user interface operatively connected to said printing device;

receiving a request to print on a selected virtual media from one of said virtual media trays through said graphic user interface; and physically altering said unaltered media currently available using said currently available media processing components to physically change said unaltered media currently available to said selected virtual media.

20. The non-transitory storage medium according to claim 19, said physically altering comprising at least one of changing a size of said unaltered media currently available, changing a shape of said unaltered media currently available, forming openings in said unaltered media currently available, changing a thickness of said unaltered media currently available, and changing a uniform background color of said unaltered media currently available.

21. The non-transitory storage medium according to claim 19, said request to print including instructions to place print markings on said selected virtual media, said physically altering comprising changing said unaltered media currently available in a manner that is different from said print markings and is in addition to said print markings.

22. The non-transitory storage medium according to claim 19, said dynamically enabling of said virtual media trays changing said virtual media trays when at least one said unaltered media currently available and said currently available media processing components change.

23. The non-transitory storage medium according to claim 19, said maintaining of said status of currently available media processing components comprising determining a current operational status of each media processing component.

24. The non-transitory storage medium according to claim 19, said method further comprising receiving a request to print on a selected unaltered media from one of said physical media trays through said graphic user interface; and printing on said selected unaltered media without physically altering said unaltered media.

* * * * *